(12) United States Patent
Vicari et al.

(10) Patent No.: US 9,142,835 B2
(45) Date of Patent: Sep. 22, 2015

(54) SEPARATOR FILM FOR BATTERIES INCLUDING OXIDATION RESISTANT VINYL ALCOHOL COPOLYMER

(75) Inventors: Richard Vicari, Pearland, TX (US); Bret F. Hann, San Antonio, TX (US)

(73) Assignee: SEKISUI SPECIALTY CHEMICALS AMERICA, LLC, Dallas, TX (US)

( * ) Notice: Subject to any disclaimer, the term of this patent is extended or adjusted under 35 U.S.C. 154(b) by 1463 days.

(21) Appl. No.: 12/313,329

(22) Filed: Nov. 19, 2008

(65) Prior Publication Data

US 2009/0148758 A1 Jun. 11, 2009

Related U.S. Application Data

(60) Provisional application No. 61/003,725, filed on Nov. 20, 2007.

(51) Int. Cl.
| | |
|---|---|
| *H01M 2/14* | (2006.01) |
| *H01M 2/16* | (2006.01) |
| *H01M 4/34* | (2006.01) |
| *H01M 10/26* | (2006.01) |
| *H01M 10/32* | (2006.01) |
| *H01M 4/48* | (2010.01) |

(52) U.S. Cl.
CPC ............ *H01M 4/483* (2013.01); *H01M 2/1653* (2013.01)

(58) Field of Classification Search
CPC .......................... H01M 4/483; H01M 2/1653
USPC ......... 429/142, 144, 206, 219, 247, 249, 254, 429/255
See application file for complete search history.

(56) References Cited

U.S. PATENT DOCUMENTS

| | | | | |
|---|---|---|---|---|
| 4,505,998 A | | 3/1985 | Hsu et al. ..................... 429/206 |
| 5,290,645 A | | 3/1994 | Tanaka et al. ................. 429/144 |
| 5,443,727 A | * | 8/1995 | Gagnon ........................ 210/490 |
| 6,033,806 A | | 3/2000 | Sugiura et al. ................ 429/229 |
| 6,124,058 A | * | 9/2000 | Ohmory et al. ............... 429/247 |
| 6,523,699 B1 | | 2/2003 | Akita et al. ................... 210/490 |
| 6,607,859 B1 | | 8/2003 | Tanaka et al. ................. 429/145 |
| 6,818,709 B1 | | 11/2004 | Vicari ............................. 526/65 |
| 6,878,483 B2 | | 4/2005 | Morokuma et al. ............ 429/94 |
| 7,029,792 B2 | | 4/2006 | Cheiky et al. ................. 429/229 |
| 7,052,800 B2 | | 5/2006 | Harada et al. ................. 429/145 |
| 7,070,884 B2 | | 7/2006 | Thompson et al. ........... 429/254 |
| 2002/0122980 A1 | * | 9/2002 | Fleischer et al. .............. 429/213 |
| 2003/0091889 A1 | * | 5/2003 | Sotomura et al. ............... 429/40 |
| 2005/0065272 A1 | | 3/2005 | Vicari ........................... 524/557 |
| 2005/0222355 A1 | | 10/2005 | Vicari ........................... 526/330 |
| 2006/0147804 A1 | | 7/2006 | Yamamoto et al. ........... 429/254 |
| 2006/0216584 A1 | * | 9/2006 | Cheiky ......................... 429/144 |
| 2006/0240317 A1 | * | 10/2006 | Phillips et al. ................ 429/144 |
| 2006/0257728 A1 | * | 11/2006 | Mortensen et al. ........... 429/144 |
| 2006/0269815 A1 | * | 11/2006 | Goldbach et al. .............. 429/33 |

FOREIGN PATENT DOCUMENTS

JP   06-349472   * 12/1994

OTHER PUBLICATIONS

Film. Dictionary.com. Dictionary.com Unabridged. Random House, Inc. http://dictionary.reference.com/browse/film (accessed: Feb. 23, 2015).*

* cited by examiner

*Primary Examiner* — Sean P Cullen

(74) *Attorney, Agent, or Firm* — Michael W. Ferrell; Ferrells, PLLC; Anna L. Kinney

(57) ABSTRACT

A separator film for an electric battery is provided to substantially eliminate electric contact between an anode component and a cathode component. The film includes a vinyl alcohol copolymer with functional comonomer units such as sulfonic acid functionalized units or salts thereof. The films are desirable for use in battery separators because they exhibit superior resistance to degeneration by oxidation, enabling the manufacture of batteries with improved conductivity, longer discharge times, and longer cycle lives.

23 Claims, No Drawings

SEPARATOR FILM FOR BATTERIES INCLUDING OXIDATION RESISTANT VINYL ALCOHOL COPOLYMER

CLAIM FOR PRIORITY

This application is based upon U.S. Provisional Patent Application Ser. No. 61/003,725, filed Nov. 20, 2007 of the same title, the priority of which is hereby claimed and the disclosure of which is incorporated herein by reference.

TECHNICAL FIELD

The present invention relates generally to separators for electric batteries. More particularly, the invention relates to a polymeric separator film with improved oxidation resistance in high-energy secondary batteries.

BACKGROUND OF THE INVENTION

A battery separator functions to prevent contact between the anode and the cathode, yet allows the transfer of certain ions that are needed to maintain consistent battery discharge. While the role performed by the battery separator is essentially passive, the design of the separator is important to provide batteries with long and consistent performance, and to substantially eliminate shorts caused by a breach in the separator. Among other requirements, the separator should be able to withstand the harsh environment of the battery, be resistant to attacks by oxidizing agents, allow the transmission of necessary ions, and have a low electrical resistance. To these ends, various separators for batteries have been described in the art.

Historically, regenerated cellulose separators were used because of their low electrical resistance and ability to conduct hydroxyl ions in alkaline environments. However, regenerated cellulose has a very low permeability to hydrogen, which is prohibitive for certain battery designs.

Following is a brief summary of references relevant to the field of battery separators.

U.S. Pat. No. 7,070,884 to Thompson, et al. describes a separator which comprises a nonwoven fabric composition having a layer of fine spunbond filaments, and a layer of thermoplastic meltblown microfibers.

Polymeric battery separator films are also well known in the art. For example, U.S. Pat. No. 4,505,998 to Hsu et al. is directed to a battery separator which is made from films cast from a cross-linked polymer having vinyl alcohol units and carboxylic acid units.

A similar approach is described in U.S. Pat. No. 5,290,645 to Tanaka et al., which relates to a battery separator that includes a hydrophilic portion and a hydrophobic portion. The hydrophilic portion is made from cross-linked polyvinyl alcohol copolymer, where the copolymer contains polymerizable cationic crosslinking compounds. The Tanaka et al. '645 patent states that the crosslinking prevents the erosion of the film by the alkaline electrolyte. U.S. Pat. No. 6,033,806 to Sugiura et al. likewise discloses a separator for batteries comprising a film of cross-linked polyvinyl alcohol having a degree of saponification of about 70-98.5%, where the polyvinyl alcohol is contacted with an oxidizing agent to cleave 1,2-diol units. The separator is reportedly durable in an alkaline environment.

U.S. Pat. No. 6,607,859 to Tanaka et al. describes a separator for a battery which is made from a fabric that includes polyolefin fibers which are treated to render them hydrophilic. As stated in '859 Tanaka et al., the hydrophilic treatment may include sulfonation, fluorination, treatment with a surfactant, or corona discharging treatment. For example, the sulfonating treatment may entail contacting the fibers with fuming sulfuric acid, and the fluorination may be performed by contacting the fibers with diluted fluorine gas. The hydrophilic treatment is likely necessary to enable sufficient wetting of the electrolyte on the hydrophobic polyolefin fibers.

U.S. Pat. No. 7,029,792 to Cheiky et al. discloses a membrane separator for a zinc-anode containing battery, where the separator is made from a mixture of (1) cellulose, and (2) a hydrophilic polymer, such as ethyl cellulose. According to the Cheiky et al., '792 patent, the separator exhibits good hydroxyl conductivity and hydrogen transport.

U.S. Pat. No. 7,052,800 to Harada et al. discloses a separator for a battery with a nickel cathode. The separator includes a laminate of a sulfonated substrate and a porous hydrophilic film. The sulfonated substrate is generally a polyolefin that is sulfonated with sulfuric acid. The hydrophilic film includes resins such as polyamide. The Harada et al. '800 patent states that the sulfo group traps nitrogen ion-containing impurities which are present in nickel cathode batteries.

Other references of interest may include U.S. Pat. No. 6,523,699 to Akita et al., U.S. Pat. No. 6,878,483 to Morokuma et al., and United States Patent Application Publication No. 2006/0147804 to Yamamoto et al.

Notwithstanding the above-noted advancements in this field, a need remains for separators that are suitable for use in batteries, which exhibit improved resistance to oxidation, and which improve the conductivity of the battery. Batteries usually have strong oxidation causing components that can degrade the separator and cause the battery to short. Moreover, the degradation process is enhanced at elevated temperatures, as are common during battery discharge. Commercially available batteries typically include numerous separator components to act as back-ups when one of the separators fails, i.e., the separators are sacrificial. This practice takes up valuable space in the battery which could otherwise be used to enlarge the anode and/or the cathode.

According to the invention, a battery separator is provided with a film or coating that comprises a polyvinyl alcohol copolymer having enhanced oxidation resistance. The copolymer generally includes sulfonic acid functional comonomer units which provide the copolymer with superior resistance to oxidation. The separator maintains superior oxidation resistance at ambient temperatures and at elevated discharge temperatures. The durability of the inventive separator enables the manufacture of batteries with improved performance as evidenced by increased capacity and cycle life (for rechargeable batteries).

SUMMARY OF THE INVENTION

According to one aspect of the present invention, there is provided an improved separator for a battery which comprises an anode, a cathode, and an electrolyte which is in communication with the anode and the cathode. The battery separator includes a film or coating which comprises vinyl alcohol copolymer with functional comonomer units, such as sulfonic acid. In some embodiments of the invention, the film or coating may also include a saccharide component.

Still further features and advantages of the invention are apparent from the following description.

DETAILED DESCRIPTION OF THE INVENTION

The invention is described in detail below with reference to numerous embodiments for purposes of exemplification and illustration only. Modifications to particular embodiments within the spirit and scope of the present invention, set forth in the appended claims, will be readily apparent to those of skill in the art.

As used herein, terminology has its ordinary meaning unless modified or supplemented by definition. For example, "percent" and the like means weight percent unless mole or volume percent is specified.

The term "battery" as used herein, refers to any electrochemical device which has anode and cathode components, and generates current by converting chemical energy into electrical energy. The term "battery" may refer to only one electric cell, or to any combination of two or more electric cells.

"Secondary battery," as used herein refers to any battery that may be repeatedly charged, discharged and then recharged, i.e., rechargeable batteries.

"Characteristic Viscosity" of a resin is measured in 4% aqueous solution (w/w) at 20° C.

The present invention is related to separators for batteries. The features of a typical battery include a casing with a positive electrode chamber and a negative electrode chamber, which are divided by a separator. Separators are typically films, fabrics, laminates, or the like, which are interposed between the anode and the cathode and are intended to prevent the battery from shorting. Both chambers include electrolyte in communication with the electrodes. The positive electrode chamber houses the cathode and the negative chamber houses the anode.

The invention provides for a battery separator which is resistant to degradation by oxidation and, thus, substantially eliminates the likelihood of a battery to short-circuit. Very generally, the battery separator of the invention includes an oxidation resistant film or coating having a vinyl alcohol copolymer that is functionalized with comonomer units such as sulfonic acid functional comonomers. In addition to the vinyl alcohol copolymer, the oxidation resistant film may also include a saccharide component, which appears to improve the operability of the separator.

The vinyl alcohol copolymer in the film or coating includes comonomer units which are functional to resist the degradation of the film when in the presence of oxidizing components. The functional comonomer units may include, for example, sulfonic acid units, carboxylic acid units, vinyl amine units, acrylamide units, dimethyl acrylamide units, salts thereof, and combinations thereof. Typically, the film used in the invention includes vinyl alcohol copolymers with sulfonic acid functional comonomers. The functional comononers may be present in an amount of from about 0.5 to about 20 mole percent to stabilize the film against degradation upon prolonged exposure to an oxidizing chemical.

Examples of the sulfonic acid comonomer units include vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, salts thereof, and combinations thereof. Preferably, the sulfonic acid functional comonomer units include predominantly salts of 2-acrylamido-2-methylpropane-sulfonic acid ("AMPS"). Salts of the free acid may include sodium, potassium, or ammonium salts, among others. The sodium salt of AMPS is referred to herein as "NaAMPS." The use of NaAMPS or other acid salts in the battery separator film are somewhat preferred to the free acid form, as the salt may promote improved conductivity.

In some embodiments, additional comonomers (i.e., other than the vinyl acetate and the functional comonomer units) may be included in amounts up to about 10 mole percent. Suitable comonomers may include, for example, (meth)acrylates; an olefin such as ethylene, propylene, or butylene; VeoVa type monomers such as VeoVa 10; and combinations thereof. However, preferably the vinyl alcohol copolymer is 98+% derived from vinyl acetate monomer ("VAM"), and the functional comonomer acid units.

Where sulfonic acid comonomer units are used, the saponified copolymer of vinyl alcohol and sulfonic acid component may have, therefore from about 0.5 to about 20 mole % preferably from about 1 to about 8 mole % of polymerized sulfonic acid component or salt thereof, about 1 to about 20 mole %, preferably from about 5 to about 10 mole % of polymerized VAM (PVAc), and from about 60 to about 99 mole %, preferably from about 75 to about 98 mole % of polymerized vinyl alcohol (PVOH), preferably about 2 to about 4 mole % of polymerized sulfonic acid component, [about 5 to about 10 mole % of PVAc] and about 85 to about 95 mole % of PVOH. The amount of each polymerized repeating unit is generally determined by $C^{13}$NMR analyses. The copolymer may have a degree of hydrolysis of, for example, about 70 to about 99+%, preferably about 80 to about 95% indicated by $C^{13}$NMR, and a relative molecular weight indicated by a characteristic viscosity of, for example, about 2 to about 50 cps, preferably about 3 to about 30 cps, even more preferably about 7 to about 10 cps.

Various methods of polymerizing vinyl acetate copolymers may be used as are known in the art. Where the functional comonomers are sulfonic acid-type units, the resin may be produced by a unique process which is described in copending United States Patent Application Publication Nos. 2005/0222355 and 2005/0065272, now U.S. Pat. Nos. 7,786,229, and 7,790,815, as well as in U.S. Pat. No. 6,818,709, all to Vicari, the entireties of which are herein incorporated by reference.

Commercially available vinyl alcohol/sulfonic acid copolymers that are suitable for use in the separator film of the invention are available from Celanese Chemicals (Dallas, Tex.) and may include about 3.5 to 4 mole percent of AMPS comonomer and/or have a degree of hydrolysis of about 98 to 99 percent, based on the mole percent of hydrolyzed acetate units.

In some embodiments, the films or coatings used in the battery separators of the invention include a saccharide component which is blended with the vinyl alcohol copolymer component. When present, the saccharide component may include polysaccharides, oligosaccharides, disaccharides, monosaccharides, or combinations thereof. Non-limiting examples include glucose (dextrose), galactose, sucrose, fructose, lactose, maltose, mannose, trehalose, and combinations thereof. The saccharide component is preferably a mono- or di-saccharide, and is preferably crystalline; most preferably the saccharide component includes dextrose. The film or coating preferably includes about 1 to about 40 parts by weight, preferably about 5 to about 25 parts saccharide component per 100 parts by weight of a vinyl alcohol component.

The separator film composition may include at least 90 wt. percent of the vinyl alcohol copolymer and saccharide component on a dry basis, and preferably at least 95 wt. percent of the vinyl alcohol copolymer and saccharide component on a dry basis. Other components may be included in the separator composition in minor amounts, such as plasticizers, biocides, fillers, extenders, antiblocking agents, anti-slipping agents, detackifying agents, anti-foaming agents, UV stabilizers, lubricants, release agents, pigments, dyes, as well as any other known additives in the polymer arts. Crosslinking agents may also be included; however, in most embodiments, the polyvinyl alcohol component is substantially free of crosslinking moieties, i.e., less than about 0.5 mole percent of the pendant —OH groups are crosslinked.

Typically, the separator film formulation is conveniently provided in an aqueous solution where the functionalized PVOH and, optionally, saccharide component, are dissolved in water. The solution may be prepared at a solids content in the range of about 5 to about 30 percent by weight, and preferably from about 10 to about 20 percent by weight.

The film or coating used in the battery separators may be fabricated by any suitable means. For example, if the film formulation is provided in an aqueous solution, a coating may be prepared by casting the solution onto another substrate and drying to produce the oxidation resistant film. The resulting PVOH-containing film or coating may have a thickness in suitable ranges of from about 0.00635 to about 1.27 mm (about 0.25 to about 50 mils), preferably from about 0.0254 to about 0.254 mm (about 1 to about 10 mils), and even more preferably from about 0.0254 to about 0.127 mm (about 1 to about 5 mils).

The separator films or coatings of the invention may be substantially continuous or may be slightly more discreet if the battery design will allow. Preferably, the PVOH containing films or coatings are microporous. The microporous films may have suitable Gurley numbers ranging from about 1 to about 150, preferably from about 5 to about 80. The Gurley number refers to the amount of time for 10 cc of air at 12.2 inches of water to pass through one square inch of the film or coating. The Gurley number is measured according to ASTM-D726. The microporous film may have an average pore size in the range of from about 0.02 to about 2 microns, and a porosity in the range of from about 20% to about 80%. In most batteries, the separator must be sufficiently porous to transmit ions between the anode portion and the cathode portion.

The functionalized PVOH containing films are included in the battery separator of the invention. The battery separator may consist solely of the functionalized PVOH film, or it may be present with or adhered to other layers as, for example, a coating. Additional suitable layers that may be used in the separator include polyolefin films, cellulosic films, and the like. The separator film is interposed in a battery between the anode and the cathode in the electrolyte medium to substantially eliminate contact between the plates. If the film of the invention is present as a coating on another substrate, the PVOH-containing film is generally positioned to be in contact with the cathode, which usually contains strong oxidizing agents.

The films prepared according to the invention act as surprisingly good separator components in batteries. The separator films are suitable to substantially eliminate contact between the anode and cathode, substantially eliminate transmission of solid electrode particles, and allow the transmission of ions across the film, and are extremely resistant to the strong oxidizing chemicals in the battery. Because the separators have excellent oxidation stability, they take longer to fail and, thus, batteries may be manufactured which have a longer life. Additionally, the separators of the invention enable batteries with improved conductivity and capacity.

It is unexpected that the films of the invention act as effective separator components because non-functionalized polyvinyl alcohol films are not effective separators and were observed to develop holes upon prolonged exposure in a battery. Furthermore, it is somewhat surprising that the sulfonated PVOH films do not simply dissolve in the alkaline electrolyte because the sulfonate groups render the film extremely hydrophilic, and the film composition is substantially soluble in water. Indeed, the films are typically applied as an aqueous coating. Instead, the films remain cohesive even after prolonged exposure to the electrolyte medium. Without intending to be bound by theory, it is believed that high salt concentration in most electrolytes may prevent the films of the invention from dissolving. For example, the alkaline electrolyte may include potassium or sodium hydroxide in amounts of from about 10 to about 60 wt. percent, typically, of from about 30 to about 50 wt. percent.

The sulfonated PVOH separators used in the invention may suitably be used in any electrolytic cell. Preferably cells with a water-based alkaline electrolyte are used. Water-based batteries are preferred from an environmental perspective. The separators are particularly useful in batteries which have a strong oxidizing component in the cathode, such as, for example silver oxide. Most preferably, the battery may also be used with a zinc anode-containing battery, such as zinc-silver oxide batteries.

The separators may be used with high-energy secondary battery applications such as those requiring a charge for more than about 5 hours, and even for charge times up to 10 or 12 hours. These batteries may be used in military applications, space applications, laptop computers, tablet computers, hand held computing devices, or any application requiring a sustained charge over a long period of time.

In view of the foregoing discussion, relevant knowledge in the art and references discussed above in connection with the Background and Detailed Description, the disclosures of which are all incorporated herein by reference, further description is deemed unnecessary.

What is claimed is:

1. A battery separator comprising a microporous film or coating which includes a vinyl alcohol copolymer with functional comonomer units selected from the group consisting of: a sulfonic acid selected from vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, and 2-acrylamido-2-methylpropane-sulfonic acid; a vinyl amine; an acrylamide; salts thereof; and mixtures thereof,
   wherein the microporous film or coating has a Gurley number in the range of from about 1 to about 150, and
   wherein further at least about 98 mole percent of the copolymer is derived from vinyl acetate and functional comonomer units, and
   wherein the film or coating is substantially soluble in water.

2. The battery separator according to claim 1, wherein the microporous film or coating has a Gurley number in the range of from about 5 to about 80.

3. The battery separator according to claim 1, wherein the microporous film or coating has an average pore size in the range of from about 0.02 to about 2 microns.

4. The battery separator according to claim 1, wherein the microporous film or coating has a porosity in the range of from about 20 to about 80%.

5. A battery comprising an anode, a cathode, an electrolyte communicating with the anode and the cathode, and a battery separator operative to substantially eliminate electronic contact between the anode and cathode and permit ionic transfer therebetween,
   wherein the improvement comprises that the battery separator comprises a film or coating which includes a vinyl alcohol copolymer,
   wherein about 90 mole percent or more of the monomer units of the copolymer include monomers derived from vinyl acetate and functional comonomer units selected from the group consisting of: a sulfonic acid selected from vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, and 2-acrylamido-2-methylpropane-sulfonic acid; a vinyl amine; salts thereof; and combinations thereof, and wherein the film or coating is substantially soluble in water.

6. The battery according to claim 5, wherein the functional comonomer units are present in an amount such that the vinyl alcohol copolymer comprises from about 0.5 to about 20 mole percent functional comonomer units.

7. The battery according to claim 5, wherein the vinyl alcohol copolymer in the film or coating is substantially free of crosslinking moieties.

8. The battery according to claim 5, wherein the battery is a secondary battery.

9. The battery according to claim 5, wherein the cathode component includes silver oxide.

10. The battery according to claim 5, wherein the electrolyte includes from about 10 to about 60 wt. percent of potassium hydroxide, sodium hydroxide, or combinations thereof.

11. The battery according to claim 5, wherein the electrolyte includes from about 30 to about 50 wt. percent of potassium hydroxide, sodium hydroxide, or combinations thereof.

12. The battery according to claim 5, wherein the film or coating has a thickness in the range of from about 1 to about 10 mils.

13. The battery according to claim 5, wherein the functional comonomer units comprise a vinyl amine or salt thereof.

14. The battery according to claim 5, wherein the film or coating further includes a saccharide component.

15. The battery according to claim 14, wherein the saccharide component is selected from the group consisting of disaccharides, monosaccharides, and combinations thereof.

16. The battery according to claim 14, wherein the saccharide component includes dextrose.

17. The battery according to claim 14, wherein the film or coating includes from about 5 to about 25 parts by weight of saccharide component per 100 parts by weight of vinyl alcohol copolymer.

18. The battery according to claim 5, wherein the film or coating has a thickness in the range of from about 1 to about 5 mils.

19. The battery according to claim 18, wherein the film or coating is fabricated by coating an aqueous solution of the vinyl alcohol copolymer onto a substrate and drying.

20. A battery comprising an anode, a cathode, an electrolyte communicating with the anode and the cathode, and a battery separator operative to substantially eliminate electronic contact between the anode and cathode and permit ionic transfer therebetween, wherein the improvement comprises that the battery separator comprises a film or coating which includes a vinyl alcohol copolymer, wherein about 90 mole percent or more of the monomer units of the copolymer include monomers derived from vinyl acetate and functional comonomer units selected from the group consisting of a sulfonic acid, a vinyl amine, an acrylamide, salts thereof, and combinations thereof, wherein the functional comonomer units include 2-acrylamido-2-methyl propane sulfonic acid (AMPS) and/or its sodium salt (NaAMPS).

21. The battery according to claim 20, wherein the functional comonomer units are predominantly NaAMPS.

22. A battery comprising an anode, a cathode, an electrolyte communicating with the anode and the cathode, and a battery separator operative to minimize the likelihood of electronic contact between the anode and the cathode and permit ionic transfer therebetween, wherein the improvement comprises that the battery separator comprises a film or coating having:
   a) from about 60 to about 99 mole percent of a vinyl alcohol copolymer which includes at least about 70 mole percent of monomers derived from vinyl acetate and from about 0.5 to about 20 mole percent of functional comonomer units effective to stabilize the film upon prolonged exposure to an oxidizing chemical; blended with
   b) from about 1 to about 40 parts by weight, per 100 parts by weight of the vinyl alcohol copolymer, of a saccharide component which includes disaccharides, monosaccharides, or combinations thereof; and wherein the film or coating is substantially soluble in water.

23. A method of using a film or coating as a separator component in a battery which has an anode component and a cathode component, the method comprising
   interposing said film or coating between said anode component and said cathode component,
   wherein said film or coating comprises a vinyl alcohol copolymer of which about 90 mole percent or more is derived from vinyl acetate monomer units and functional comonomer units selected from the group consisting of: a sulfonic acid selected from vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, and 2-acrylamido-2-methylpropane-sulfonic acid; a vinyl amine; salts thereof; and combinations thereof, and
   wherein the film or coating is substantially soluble in water.

* * * * *